(12) United States Patent
Zeng (10) Patent No.: US 10,730,278 B1
(45) Date of Patent: Aug. 4, 2020

(54) SELF-SERVICE FILM STICKING MACHINE FOR SMART MOBILE DEVICE

(71) Applicant: Shenzhen MMT Technology Co., Ltd., Shenzhen (CN)

(72) Inventor: Wei Zeng, Shenzhen (CN)

(73) Assignee: Shenzhen MMT Technology Co., Ltd., Shenzhen (CN)

( * ) Notice: Subject to any disclaimer, the term of this patent is extended or adjusted under 35 U.S.C. 154(b) by 0 days.

(21) Appl. No.: 16/413,583

(22) Filed: May 15, 2019

(30) Foreign Application Priority Data

Mar. 29, 2019 (CN) .......................... 2019 1 0252732

(51) Int. Cl.
| | |
|---|---|
| *B32B 37/18* | (2006.01) |
| *B32B 41/00* | (2006.01) |
| *B32B 38/10* | (2006.01) |
| *B32B 38/16* | (2006.01) |

(52) U.S. Cl.
CPC ............ *B32B 37/182* (2013.01); *B32B 38/10* (2013.01); *B32B 38/162* (2013.01); *B32B 41/00* (2013.01); *B32B 2457/20* (2013.01)

(58) Field of Classification Search
USPC ....................................................... 156/538
See application file for complete search history.

(56) References Cited

U.S. PATENT DOCUMENTS

| | | | | |
|---|---|---|---|---|
| 7,889,284 B1* | 2/2011 | Nemeth | ............. | G02F 1/13338 345/173 |
| 8,393,377 B2* | 3/2013 | Patel | ...................... | B29C 63/02 156/538 |
| 8,482,537 B2* | 7/2013 | Shimizu | .................. | G06F 3/045 345/173 |
| 8,531,834 B2* | 9/2013 | Rayner | ................. | G06F 1/1633 361/679.56 |
| 8,642,173 B2* | 2/2014 | O'Donnell | ................. | C09J 7/25 428/354 |
| 8,905,107 B2* | 12/2014 | Patel | ................... | B29C 63/0004 156/279 |
| 8,995,126 B2* | 3/2015 | Rayner | .................. | H04M 1/18 361/679.56 |
| 9,003,591 B2* | 4/2015 | Sakashita | ............. | B08B 7/0028 15/104.002 |
| 9,010,396 B2* | 4/2015 | Patel | ................... | B29C 63/0004 156/443 |

(Continued)

*Primary Examiner* — Sing P Chan
(74) *Attorney, Agent, or Firm* — Westbridge IP LLC (57) ABSTRACT

The present disclosure discloses a self-service film sticking machine for smart mobile device; wherein the self-service film sticking machine for smart mobile device includes a case, a master controller, a fixing table, a display screen cleaning mechanism, a film sheet feeding mechanism, a film stripping mechanism, a film sticking manipulator and a three-dimensional travelling mechanism to control front-back, left-right, and up-down motions of the film sticking manipulator; beneficial effect: the present disclosure may automatically stick film on the user's smart mobile device, which may greatly reduce the cost of the manual film sticking, greatly improve the efficiency and quality of the film sticking, and meet the needs of users to stick film at any time, compared to the traditional manual film sticking, thereby, the present disclosure has strong practicability and good use effect.

10 Claims, 9 Drawing Sheets

(56) References Cited

U.S. PATENT DOCUMENTS

| | | | |
|---|---|---|---|
| 9,033,019 B2* | 5/2015 | Patel | H04M 1/0266 156/528 |
| 9,089,085 B2* | 7/2015 | Patel | H05K 13/00 |
| 9,192,086 B2* | 11/2015 | Hsu | H05K 13/00 |
| 9,276,626 B2* | 3/2016 | Rayner | H01H 13/06 |
| 9,283,731 B2* | 3/2016 | Leonhard | C09J 7/29 |
| 9,287,916 B2* | 3/2016 | Wicks | H04B 1/3888 |
| 9,300,344 B2* | 3/2016 | Rayner | G06F 1/1613 |
| 9,559,741 B2* | 1/2017 | Rayner | H01H 13/06 |
| 9,582,040 B2* | 2/2017 | Leonhard | G06F 1/1637 |
| 9,660,684 B2* | 5/2017 | Rayner | H01H 13/06 |
| 9,662,860 B2* | 5/2017 | Wadsworth | B29C 66/861 |
| 9,701,062 B2* | 7/2017 | Wadsworth | B29C 66/861 |
| 9,701,096 B2* | 7/2017 | Beaupre | B29C 66/861 |
| 9,757,934 B2* | 9/2017 | Wadsworth | B32B 37/26 |
| 9,902,111 B2* | 2/2018 | Wadsworth | B29C 63/0004 |
| 9,918,418 B2* | 3/2018 | Chou | B29C 63/0004 |
| 9,931,823 B2* | 4/2018 | Patel | H04M 1/0266 |
| 10,021,818 B2* | 7/2018 | Patel | B29C 63/0047 |
| 10,065,365 B2* | 9/2018 | Lane | B29C 66/342 |
| 10,076,872 B2* | 9/2018 | Witham | G06F 1/1626 |
| 10,090,877 B2* | 10/2018 | Rayner | H05K 5/0004 |
| 10,155,370 B2* | 12/2018 | Wadsworth | B29C 63/0047 |
| 10,213,090 B2* | 2/2019 | Sakashita | C11D 3/3761 |
| 10,259,019 B2* | 4/2019 | Mayfield | H04M 1/72569 |
| 10,259,020 B2* | 4/2019 | Mayfield | G06F 1/32 |
| 10,259,021 B2* | 4/2019 | Mayfield | H04M 1/21 |
| 10,272,474 B2* | 4/2019 | Mayfield | A45C 11/38 |
| 10,321,800 B2* | 6/2019 | Caligiuri | A47L 13/16 |
| 10,386,892 B2* | 8/2019 | Mody | G06F 1/1626 |
| 10,396,843 B2* | 8/2019 | Rayner | H04M 1/18 |
| 10,399,315 B2* | 9/2019 | Patel | B32B 37/0053 |
| 10,493,496 B2* | 12/2019 | Mayfield | A47L 25/00 |
| 10,555,445 B2* | 2/2020 | Patel | H05K 13/00 |
| 10,562,077 B2* | 2/2020 | Mayfield | B08B 1/006 |
| 2011/0267301 A1* | 11/2011 | Shimizu | G06F 3/045 345/174 |
| 2012/0211168 A1* | 8/2012 | Patel | B29C 63/0004 156/391 |
| 2012/0211170 A1* | 8/2012 | Patel | B29C 63/0004 156/538 |
| 2012/0211171 A1* | 8/2012 | Patel | B29C 63/0004 156/538 |
| 2012/0314354 A1* | 12/2012 | Rayner | H05K 5/061 361/679.01 |
| 2013/0027862 A1* | 1/2013 | Rayner | H05K 5/0004 361/679.3 |
| 2013/0045371 A1* | 2/2013 | O'Donnell | C09J 7/29 428/215 |
| 2013/0045372 A1* | 2/2013 | O'Donnell | C09J 7/29 428/215 |
| 2013/0059117 A1* | 3/2013 | Hill | G06F 1/1626 428/138 |
| 2013/0125322 A1* | 5/2013 | Sakashita | B08B 7/0028 15/104.002 |
| 2013/0199714 A1* | 8/2013 | Patel | B29C 63/0047 156/249 |
| 2013/0280463 A1* | 10/2013 | On | B32B 3/10 428/38 |
| 2013/0334072 A1* | 12/2013 | Rayner | H01L 23/10 206/37 |
| 2014/0124146 A1* | 5/2014 | Patel | B29C 63/02 156/574 |
| 2014/0130971 A1* | 5/2014 | Wu | H05K 13/00 156/249 |
| 2014/0230988 A1* | 8/2014 | Chou | B29C 63/0004 156/60 |
| 2014/0233167 A1* | 8/2014 | Rayner | |
| 2014/0311928 A1* | 10/2014 | Mayfield | A45C 11/00 206/205 |
| 2014/0332417 A1* | 11/2014 | Wicks | H04B 1/3888 206/37 |
| 2015/0041069 A1* | 2/2015 | Wadsworth | B32B 37/26 156/535 |
| 2015/0047773 A1* | 2/2015 | Wadsworth | B29C 63/0047 156/182 |
| 2015/0107767 A1* | 4/2015 | Wadsworth | B29C 66/861 156/324 |
| 2015/0169089 A1* | 6/2015 | Dixon | H04B 1/3888 428/137 |
| 2015/0171913 A1* | 6/2015 | Rayner | H05K 5/0017 455/575.8 |
| 2015/0246515 A1* | 9/2015 | Patel | B32B 37/0053 156/579 |
| 2015/0320293 A1* | 11/2015 | Sakashita | C09J 133/08 15/104.002 |
| 2015/0321416 A1* | 11/2015 | Patel | H05K 13/00 156/249 |
| 2016/0099741 A1* | 4/2016 | Rayner | G06F 1/1613 455/575.8 |
| 2016/0213222 A1* | 7/2016 | Sakashita | C11D 17/04 |
| 2016/0288458 A1* | 10/2016 | Lane | B29C 66/861 |
| 2016/0288470 A1* | 10/2016 | Wadsworth | B29C 66/861 |
| 2016/0288471 A1* | 10/2016 | Beaupre | B29C 66/861 |
| 2016/0288477 A1* | 10/2016 | Wadsworth | B29C 66/861 |
| 2016/0355003 A1* | 12/2016 | Luo | B32B 37/06 |
| 2017/0001364 A1* | 1/2017 | MacDonald | B29C 65/7802 |
| 2017/0237460 A1* | 8/2017 | Rayner | G06F 1/1656 455/575.8 |
| 2017/0245732 A1* | 8/2017 | Mayfield | H04M 1/21 |
| 2017/0253014 A1* | 9/2017 | Kleeman | B32B 37/003 |
| 2017/0297268 A1* | 10/2017 | Witham | G06F 1/1626 |
| 2017/0326813 A1* | 11/2017 | Lane | B29C 66/861 |
| 2018/0009005 A1* | 1/2018 | Caligiuri | A47L 13/16 |
| 2018/0036992 A1* | 2/2018 | Ma | B32B 17/06 |
| 2018/0037016 A1* | 2/2018 | Kim | H04B 1/3888 |
| 2018/0093303 A1* | 4/2018 | Mayfield | H04M 1/72569 |
| 2018/0117636 A1* | 5/2018 | Mayfield | A45C 11/38 |
| 2018/0133759 A1* | 5/2018 | Mayfield | H04M 1/72569 |
| 2018/0222170 A1* | 8/2018 | Patel | B29C 63/0004 |
| 2018/0307278 A1* | 10/2018 | Mody | H04M 1/0266 |
| 2018/0309867 A1* | 10/2018 | Sabin | G06F 3/013 |
| 2018/0324987 A1* | 11/2018 | Patel | B29C 63/0047 |
| 2018/0337704 A1* | 11/2018 | Rayner | H05K 5/0004 |
| 2018/0345325 A1* | 12/2018 | Mayfield | A47L 25/00 |
| 2019/0134921 A1* | 5/2019 | Witham | G06F 1/1626 |
| 2019/0302510 A1* | 10/2019 | Zhao | C08J 5/18 |
| 2019/0321863 A1* | 10/2019 | Mayfield | H04M 1/72569 |
| 2019/0321864 A1* | 10/2019 | Mayfield | B08B 1/002 |
| 2019/0375670 A1* | 12/2019 | Altaras | G06K 9/00087 |
| 2019/0381775 A1* | 12/2019 | Patel | B32B 37/18 |

\* cited by examiner

SELF-SERVICE FILM STICKING MACHINE FOR SMART MOBILE DEVICE

FIELD

The present disclosure relates to the field of automation equipment, and in particular, to a self-service film sticking machine for smart mobile device.

BACKGROUND

In the present life, people often use smart mobile terminals such as smart phones or tablet computers, and, they often stick a protective film on the display screen of the smart mobile terminals to isolate and protect the display screen to avoid accidental cracking or breaking.

While the traditional way to stick film on the display screen usually is to stick it manually by professionals. Although the manual film sticking is widely used, it still has certain defects and shortcomings.

Specifically, on the one hand, the manual film sticking has high cost and low efficiency, and the sticking film is prone to misaligned; on the other hand, the manual film sticking requires users to take their smart mobile terminals to professional film-sticking stores for sticking, and probably cannot stick the film in time when the store staff is away, which cannot meet the needs of users.

Thereby, in the light of existing circumstances, it is very necessary to design a self-service film sticking machine for smart mobile device to reduce the cost of manual film-sticking, improve the efficiency and quality of film-sticking, and meet the needs of users to stick film at any time.

SUMMARY

The object of the present disclosure is to provide a self-service film sticking machine for smart mobile device to overcome the aforementioned shortcomings of the prior art.

The present disclosure provides a self-service film sticking machine for smart mobile device, including a case and a master controller arranged in the case, the self-service film sticking machine for smart mobile device further includes, a fixing table; the fixing table is slidably defined on the middle of the upper end surface of the case, and is connected with the master controller, for fixing a smart mobile device where the display screen needs film-sticking;

a display screen cleaning mechanism; the display screen cleaning mechanism is arranged upon the upper end surface of the case, and located above and in front of the fixing table, and connected with the master controller, for cleaning the display screen of the smart mobile device that fixed on the fixing table;

a film sheet feeding mechanism; the film sheet feeding mechanism is fixed at the rear side of the upper end surface of the case, and connected with the master controller, for feeding a film sheet having bottom protective film and surface base film, and a tear-prone part is defined forward in the front side of the bottom protective film;

a film stripping mechanism; the film stripping mechanism is fixed at the left side of the upper end surface of the case, and connected with the master controller, for stripping the bottom protective film of the film sheet that fed by the film sheet feeding mechanism;

a film sticking manipulator; the film sticking manipulator is fixed on a three-dimensional travelling mechanism; and a three-dimensional travelling mechanism; the three-dimensional travelling mechanism is arranged upon the upper end surface of the case, and connected with the master controller for controlling front-back, left-right, and up-down motions of the film sticking manipulator, so that the film sticking manipulator grasp the film sheet fed by the film sheet feeding mechanism to the film stripping mechanism for stripping the bottom protective film, and grasp and attach the stripped surface base film to the display screen of the smart mobile device, which is fixed on the fixing table and has been cleaned by the display screen cleaning mechanism.

Following is a further exposition of the self-service film sticking machine for smart mobile device.

In an exemplary embodiment, the fixing table includes a belt drive linear module A set along the front and rear directions and connected with the master controller, and a positioning table fixed at the upper end surface of the belt drive linear module A;

the middle of the upper end surface of the positioning table defines a receiving cavity suitable for receiving the smart mobile device; the depth of the receiving cavity is less than the thickness of the smart mobile device, and the inner wall of the receiving cavity is evenly defined with a plurality of elastic clamps connected with the master controller to clamp the smart mobile device received in the receiving cavity.

In an exemplary embodiment, the display screen cleaning mechanism includes a frame in the middle and front of the upper end surface of the case and located beside the positioning table, a cleaning cloth releasing mechanism fixed behind and above the frame to release the cleaning cloth, a vibrating cloth pressing mechanism fixed below the frame to press the cleaning cloth on the display screen of the smart mobile device that located on the positioning table below the cleaning cloth, so as to clean the display screen of the smart mobile device by driving the cleaning cloth by vibration, and a cleaning cloth rolling mechanism fixed in front of and above the frame to roll up the used cleaning cloth;

the cleaning cloth releasing mechanism includes a first rotary motor fixed above the frame and connected with the master controller to release the cleaning cloth, a first reel arranged on the rotating shaft of the first rotary motor and rolled up with cleaning cloth, and a cloth guide wheel arranged on the frame and below the first reel;

the vibrating cloth pressing mechanism includes a fixing base fixed below the frame, a vibrating base mounted at the lower side of the fixing base by a spring component, a vibrating motor fixed on the vibrating base and connected with the master controller, and two parallel superior rubber strips mounted at the bottom of the vibrating base to press the cleaning cloth downward;

the cleaning cloth rolling mechanism includes a second rotary motor fixed above the frame and connected with the master controller to roll up the cleaning cloth, a cloth rolling main roller arranged on the rotating shaft of the second rotary motor to guide the cleaning cloth, a cloth rolling auxiliary roller arranged on the frame and located beside the cloth rolling main roller to compress the cleaning cloth to the cloth rolling main roller, and a second reel arranged on the frame and above the cloth rolling main roller and linked connected with the rotating shaft of the second rotary motor by drive belt to roll up the cleaning cloth.

In an exemplary embodiment, the display screen cleaning mechanism further includes a cleaning bottle fixed above the frame with cleaning solution filled, a humidifying nozzle fixed below the frame and located between the middle and above of the two superior rubber strips to automatically spray the cleaning solution to the cleaning cloth below, an inverted L-shaped bracket mounted on the frame and located at the back side of the two superior rubber strips, and an ultraviolet LED light strip mounted horizontally on the top of the inverted L-shaped bracket;

a liquid inlet of the humidifying nozzle is connected with a liquid outlet of the cleaning bottle through a pipeline, and the humidifying nozzle and the ultraviolet LED light strip are further connected with the master controller.

In an exemplary embodiment, the film sheet feeding mechanism includes a plurality of film sheet holders, each of which defines an open upper end, the plurality of film sheet holders are arranged side by side from left to right to store film sheets with different types and sizes, a film sheet in-place detection sensor arranged at the inner wall of the open upper end of each film sheet holder and connected with the master controller, a belt drive linear module B arranged at the bottom of the plurality of the film sheet holders along the left and right directions, a motor lifting member fixed on the belt drive linear module B in the vertical direction and connected with the master controller, and a pushing member arranged on the top of the motor lifting member;

the inner bottom of each film sheet holder is defined with a slot downward; under the control of the master controller, the belt drive linear module drive the motor lifting member to move side-to-side to allow the pushing member corresponding to the position of any slot, and under the control of the master controller, the motor lifting member drive the pushing member to rise to the corresponding position inside the slot to allow the film sheets placed in the film sheet holders in the corresponding position being pushed upward to the open upper end of the film sheet holders.

In an exemplary embodiment, the film sheet holder is provided with two rows; and the motor lifting member and the pushing member are provided with two sets respectively, and the left and right sides inside each film sheet holder are defined with the slot respectively, and the middle part inside each film sheet holder is defined with two left-right movable plates along the front and rear directions, so that each film sheet holder is divided into two film sheet storage bins;

the sizes of the two film sheet storage bins are adjustable when moving the two movable plates left or right.

In an exemplary embodiment, the film stripping mechanism includes a film sheet turntable arranged at the left rear side of the upper end surface of the case, a waste collection box having an open upper end arranged at the left front side of the upper end surface of the case, and a film-tearing device arranged beside the waste collection box to tear the bottom protective film;

a slope set forward and downward is defined in the front end of the film sheet turntable, the front edge of the slope is connected to the back edge of the open upper end of the waste collection box; the film-tearing device includes a film-tearing base arranged at the upper end surface of the case, a rotary motor fixed towards left on the film-tearing base and connected with the master controller, and a press claw fixed on the left rotating shaft of the rotary motor to compress the tear-prone part in the front side of the bottom protective film to the slope;

the bottom protective film and the surface base film are automatically separated, when the rotary motor drives the press claw to compress the tear-prone part in the front side of the bottom protective film to the slope, and the film sticking manipulator picks up the surface base film.

In an exemplary embodiment, the three-dimensional travelling mechanism includes a left bracket, a right bracket, a drive motor fixed at the front end of the left bracket, a first driven wheel fixed at the back end of the left bracket, a left gearing wheel belt sleeved between the rotating shaft of the drive motor and the first driven wheel, a second driven wheel fixed at the back end of the right bracket, a third driven wheel fixed at the front end of the right bracket, a right gearing wheel belt sleeved between the second driven wheel and the third driven wheel, a transmission shaft connected between the first driven wheel and the second driven wheel, a front-back slide rail arranged at the upper end surface of the left bracket and the right bracket along the front and rear directions, a crossbeam component where the left and right sides are correspondingly fixed at the left gearing wheel belt and the right gearing wheel belt and the two sides of the bottom are front-back movably clamped outside the front-back slide rail, a screw drive linear module fixed at the upper end surface of the crossbeam component along the left and right directions, a belt drive linear module C arranged at the front side of an upper slider of the screw drive linear module along the up and down directions, and a belt drive linear module D arranged at the back side of the upper slider of the screw drive linear module along the up and down directions;

the drive motor, the screw drive linear module, the belt drive linear module C and the belt drive linear module D are connected with the master controller respectively.

In an exemplary embodiment, the film sticking manipulator includes a film pressing member fixed at a front slider of the belt drive linear module C, and a vacuum suction plate fixed at a back slider of the belt drive linear module D and connected with the master controller;

the film pressing member includes a screw lifting motor fixed at the upper slider of the belt drive linear module C along the vertical direction and connected with the master controller, a connecting plate A horizontally fixed at the bottom of the screw lifting motor, a connecting plate B horizontally arranged below the connecting plate A, an elastic buffer fixed between the connecting plate A and the connecting plate B, two lugs respectively arranged at the left and the right sides of the bottom of the connecting plate B and a roll barrel rotatably connected between the two lugs.

In an exemplary embodiment, the smart mobile device is a smart phone or a tablet computer.

The self-service film sticking machine for smart mobile device of the present disclosure maybe placed in shopping malls, office buildings and roadsides places when in use. The smart mobile device that user carries with him/her is placed on the fixing table, the display screen of the smart mobile device of the user may be automatically cleaned by the display screen cleaning mechanism, the film sheet may be fed by the film sheet feeding mechanism, the bottom protective film of the film sheet that fed by the film sheet feeding mechanism may be stripped by the film stripping mechanism, the film sticking manipulator may be controlled by the three-dimensional travelling mechanism for front-back, left-right, and up-down motions, so that the film sticking manipulator may grasp the film sheet fed by the film sheet feeding mechanism to the film stripping mechanism for stripping the bottom protective film, and grasp and attach the stripped surface base film to the display screen of the smart mobile device, the display screen of which is fixed on the fixing table and has been cleaned by the display screen cleaning mechanism. In this way, compared to the traditional manual film sticking, the present disclosure may automatically stick film on the user's smart mobile device, which may greatly reduce the cost of the manual film sticking, greatly improve the efficiency and quality of the film sticking, and meet the needs of users to stick film at any time. Thereby, the present disclosure has strong practicability and good use effect.

BRIEF DESCRIPTION OF THE DRAWINGS

To illustrate the technical solutions according to the embodiments of the present invention or in the prior art more clearly, the accompanying drawings for describing the embodiments or the prior art are introduced briefly in the following. Apparently, the accompanying drawings in the following description are only about some embodiments of the present invention, and persons of ordinary skill in the art can derive other drawings from the accompanying drawings without creative efforts.

The realization of the aim, functional characteristics, advantages of the present disclosure are further described specifically with reference to the accompanying drawings and embodiments.

Labels illustration for drawings:
Self-service film sticking machine for smart mobile device 1000;
Fixing table 10;
Belt drive linear module A101; positioning table 102; receiving cavity 1021; elastic clamps 1022;
Display screen cleaning mechanism 20;
Frame 201; cleaning cloth releasing mechanism 202; first rotary motor 2021; first reel 2022; cloth guide wheel 2023; vibrating cloth pressing mechanism 203; fixing base 2031; spring component 2032; vibrating base 2033; vibrating motor 2034; superior rubber strips 2035; cleaning cloth rolling mechanism 204; second rotary motor 2041; cloth rolling main roller 2042; cloth rolling auxiliary roller 2043; drive belt 2044; second reel 2045; idler roller 205; cleaning bottle 206; humidifying nozzle 207; inverted L-shaped bracket 208; ultraviolet LED light strip 209;
Film sheet feeding mechanism 30;
Film sheet holder 301; slot 3011; movable plate 3012; film sheet in-place detection sensor 302; belt drive linear module B303; motor lifting member 304; pushing member 305;
Film stripping mechanism 40;
Film sheet turntable 401; slope 4011; waste collection box 402; film-tearing device 403; film-tearing base 4031; rotary motor 4032; press claw 4033;
Film sticking manipulator 50;
Film pressing member 51; screw lifting motor 511; connecting plate A512; connecting plate B513; elastic buffer 514; lug 515; roll barrel 516; vacuum suction plate 52;
Three-dimensional travelling mechanism 60;
Left bracket 601; right bracket 602; drive motor 603; first driven wheel 604; left gearing wheel belt 605; second driven wheel 606; third driven wheel 607; right gearing wheel belt 608; transmission shaft 609; front-back slide rail 610; cross-beam component 611; screw drive linear module 612; belt drive linear module C613; belt drive linear module D614;
Smart mobile device 2000;
Film sheet 3000;
Tear-prone part 30001

DETAILED DESCRIPTION OF THE EMBODIMENTS

The technical solutions of the embodiments of the present disclosure will be clearly and completely described in the following with reference to the accompanying drawings. It is obvious that the embodiments to be described are only a part rather than all of the embodiments of the present disclosure. All other embodiments obtained by persons skilled in the art based on the embodiments of the present invention without creative efforts shall fall within the protection scope of the present invention.

It is to be understood that, all of the directional instructions in the exemplary embodiments of the present disclosure (such as top, down, left, right, front, back . . . ) can only be used for explaining relative position relations, moving condition of the elements under a special form (referring to figures), and so on, if the special form changes, the directional instructions changes accordingly.

In addition, the descriptions, such as the "first", the "second" in the present disclosure, can only be used for describing the aim of description, and cannot be understood as indicating or suggestting relative importance or impliedly indicating the number of the indicated technical character. Therefore, the character indicated by the "first", the "second" can express or impliedly include at least one character. In addition, the technical proposal of each exemplary embodiment can be combined with each other, however the technical proposal must base on that the ordinary skill in that art can realize the technical proposal, when the combination of the technical proposals occurs contradiction or cannot realize, it should consider that the combination of the technical proposals does not existed, and is not contained in the protection scope required by the present disclosure.

Figure 1:
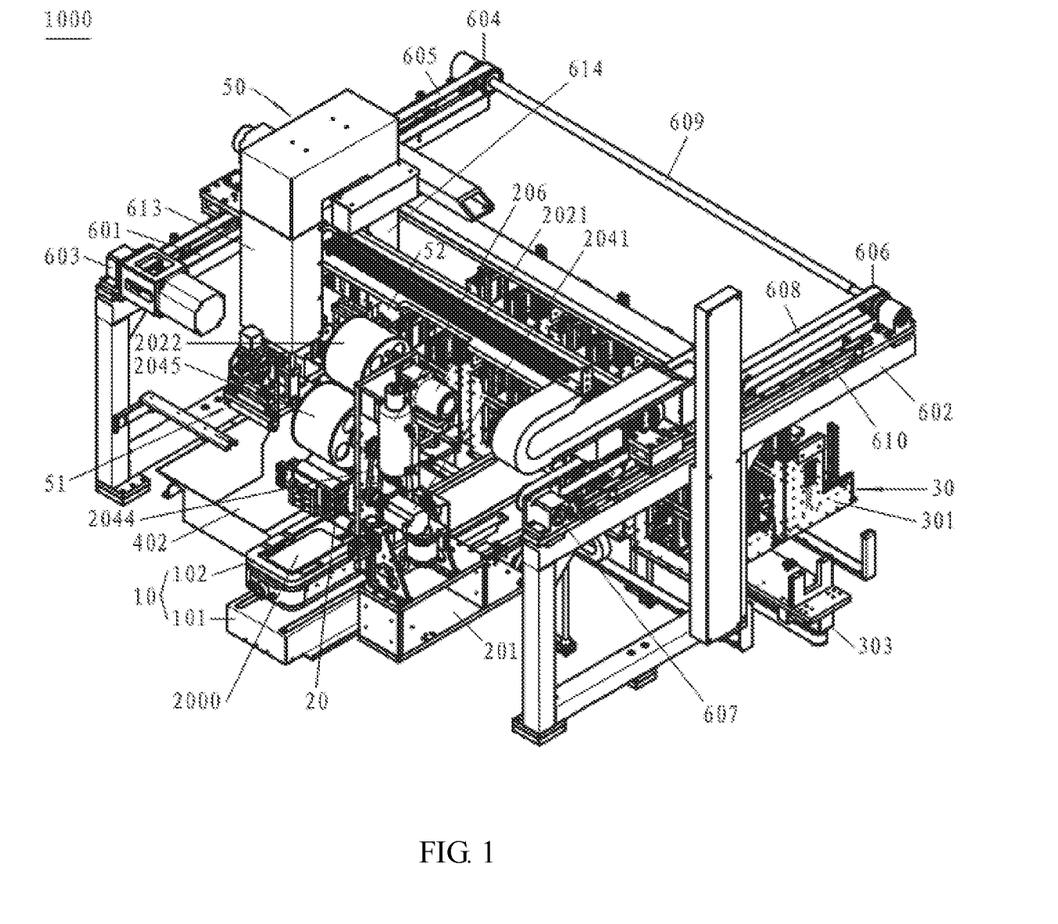
FIG. 1 is a first overall structure diagram of the self-service film sticking machine for smart mobile device according to the present disclosure.
Figure 2:
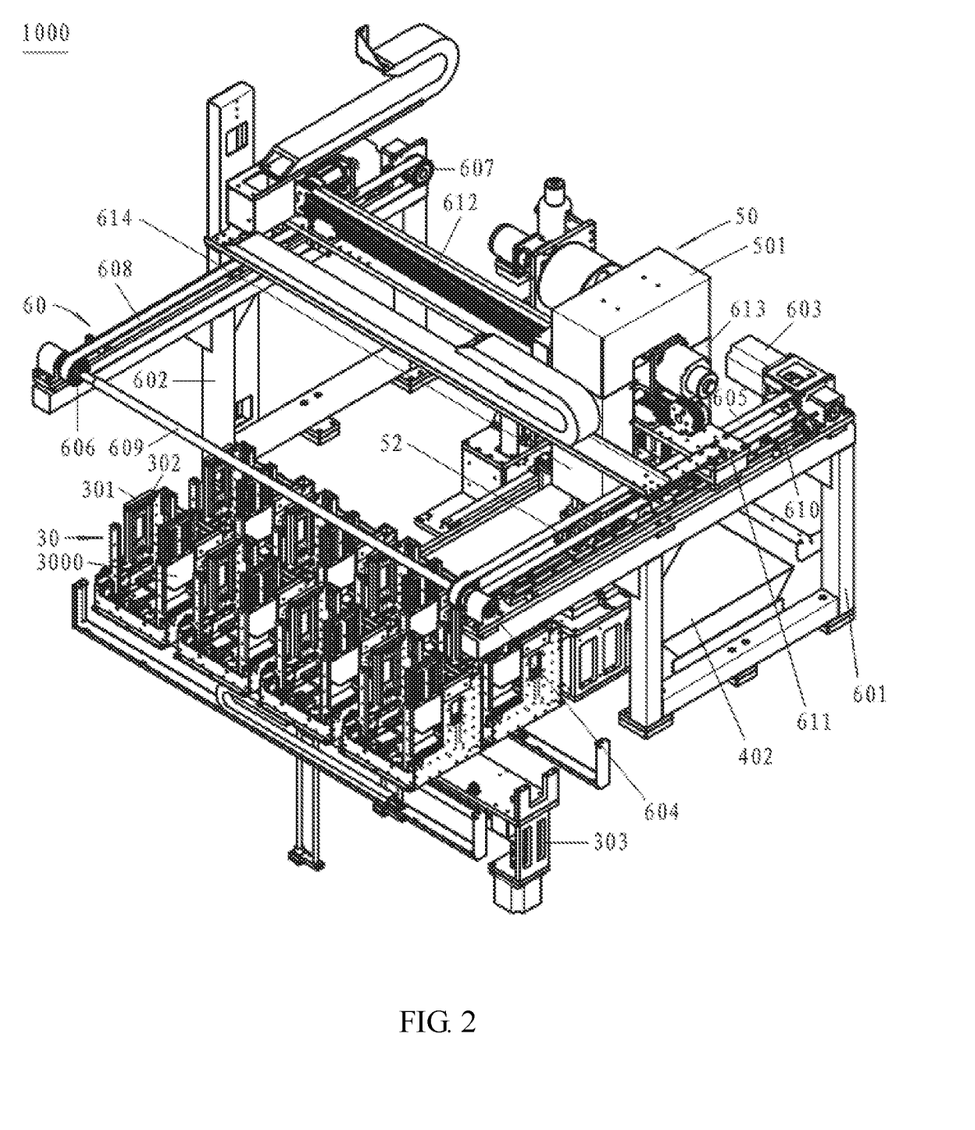
FIG. 2 is a second overall structure diagram of the self-service film sticking machine for smart mobile device according to the present disclosure.

Referring to FIGS. 1 to 9, the present disclosure provides a self-service film sticking machine for smart mobile device 1000, including a case and a master controller arranged in the case, the self-service film sticking machine for smart mobile device 1000 further includes:

a fixing table 10; the fixing table 10 is slidably defined on the middle of the upper end surface of the case, and is connected with the master controller, for fixing a smart mobile device 2000, the display screen of which needs film-sticking;

a display screen cleaning mechanism 20; the display screen cleaning mechanism 20 is arranged upon the upper end surface of the case, and located above and in front of the fixing table 10, and connected with the master controller, for cleaning the display screen of the smart mobile device 2000 that is fixed on the fixing table 10;

a film sheet feeding mechanism 30; the film sheet feeding mechanism 30 is fixed at the rear side of the upper end surface of the case, and connected with the master controller, for feeding the film sheet 3000 having bottom protective film and surface base film, and a tear-prone part 30001 is defined forward in the front side of the bottom protective film;

a film stripping mechanism 40; the film stripping mechanism 40 is fixed at the left side of the upper end surface of the case, and connected with the master controller, for stripping the bottom protective film of the film sheet 3000 that fed by the film sheet feeding mechanism 30;

a film sticking manipulator 50; the film sticking manipulator 50 is fixed on a three-dimensional travelling mechanism 60; and a three-dimensional travelling mechanism 60; the three-dimensional travelling mechanism 60 is arranged upon the upper end surface of the case, and connected with the master controller, for controlling front-back, left-right, and up-down motions of the film sticking manipulator 50, so that the film sticking manipulator 50 grasp the film sheet 3000 fed by the film sheet feeding mechanism 30 to the film stripping mechanism 40 for stripping the bottom protective film and grasp and attach the stripped surface base film to the display screen of the smart mobile device, which is fixed on the fixing table 10 and has been cleaned by the display screen cleaning mechanism 20.

Based on the above description, it will be understood that the self-service film sticking machine for smart mobile device 1000 provided in the present disclosure may be placed in shopping malls, office buildings, and roadsides places when in use.

The smart mobile device 2000 that the user carries with him/her is placed on the fixing table 10, the display screen of the smart mobile device 2000 is automatically cleaned by the display screen cleaning mechanism 20, the film sheet 3000 is fed by the film sheet feeding mechanism 30, the bottom protective film at the bottom of the film sheet 3000 that fed by the film sheet feeding mechanism 30 is stripped by the film stripping mechanism 40, the film sticking manipulator 50 is controlled by the three-dimensional travelling mechanism 60 for front-back, left-right, and up-down motions, so that the film sticking manipulator 50 grasp the film sheet 3000 fed by the film sheet feeding mechanism 30 to the film stripping mechanism 40 for stripping the bottom protective film, and grasp and attach the stripped surface base film to the display screen of the smart mobile device 2000 which is fixed on the fixing table 10 and has been cleaned by the display screen cleaning mechanism 20. In this way, compared to the traditional manual film sticking, the present disclosure automatically sticks film on the user's smart mobile device 2000, which greatly reduces the cost of the manual film sticking, greatly improves the efficiency and quality of the film sticking, and meet the needs of users to stick film at any time.

Thereby, the present disclosure has strong practicability and good use effect.

Furthermore, in the present disclosure, the fixing table 10 includes a belt drive linear module A101 set along the front and rear directions and connected with the master controller, and a positioning table 102 fixed at the upper end surface of the belt drive linear module A101.

The middle of the upper end surface of the positioning table 102 defines a receiving cavity 1021 for receiving the smart mobile device 2000. The depth of the receiving cavity 1021 is less than the thickness of the smart mobile device 2000, and the inner wall of the receiving cavity 1021 is evenly defined with a plurality of elastic clamps 1022 connected with the master controller to clamp the smart mobile device 2000 received in the receiving cavity 1021.

Thus, the fixing table 10 provided in the present disclosure may be used for fixing the smart mobile device 2000 with different types and sizes, so as to meet the needs of the popularity.

Figure 3:
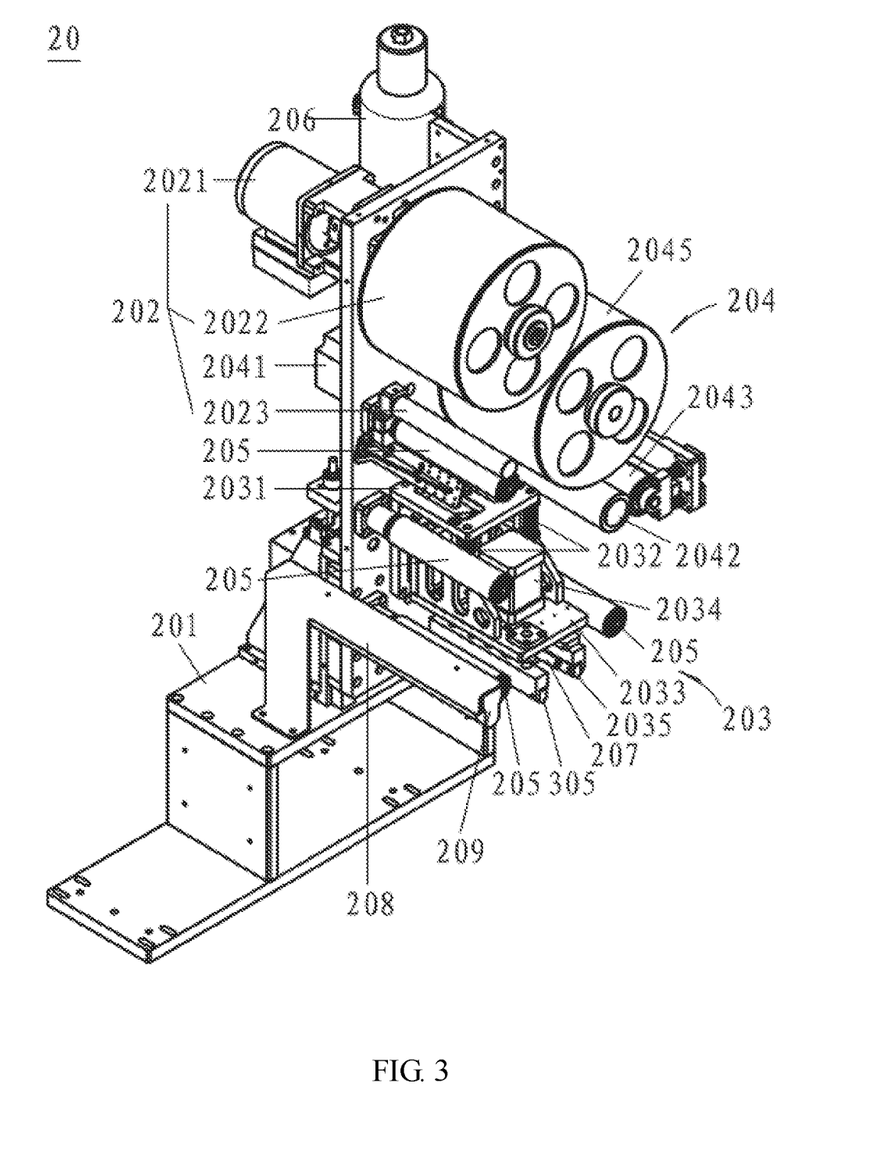
FIG. 3 is a first overall structure diagram of a display screen cleaning mechanism according to the present disclosure.
Figure 4:
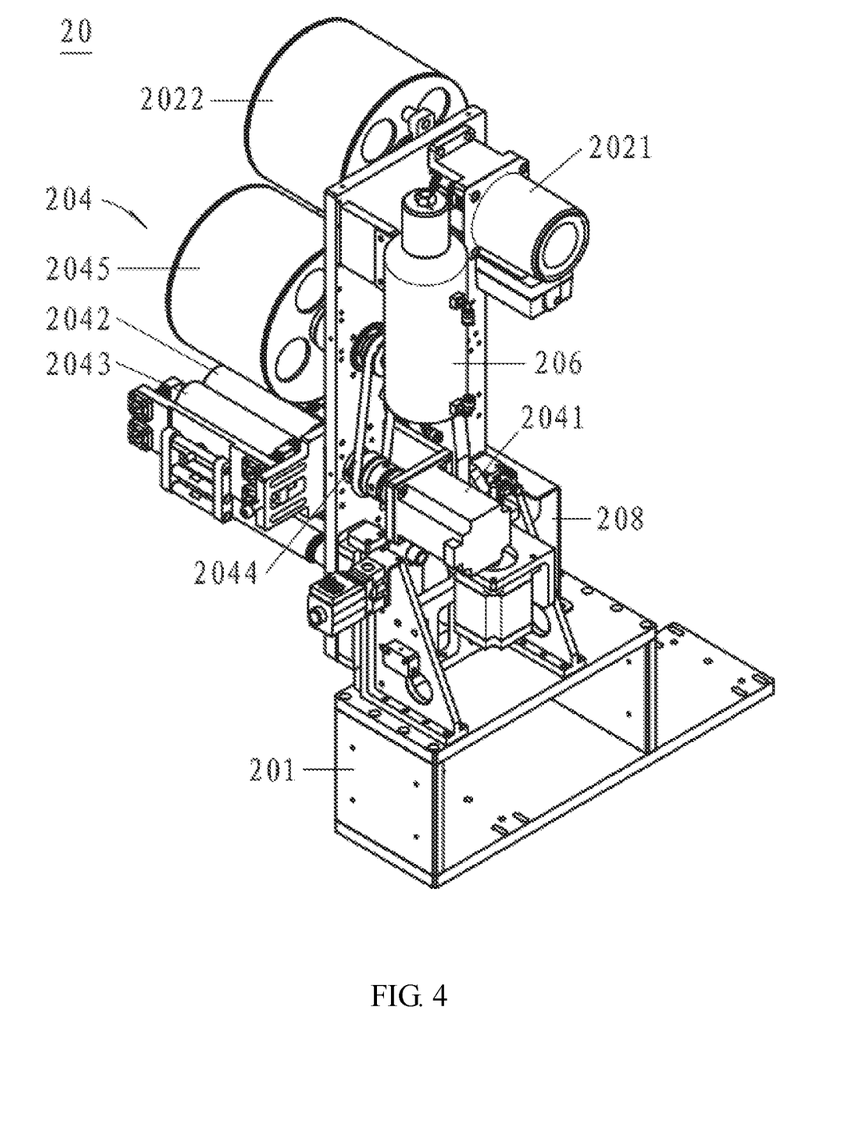
FIG. 4 is a second overall structure diagram of the display screen cleaning mechanism according to the present disclosure.

Furthermore, in the present disclosure, the display screen cleaning mechanism 20 includes a frame 201 stood in the middle and front of the upper end surface of the case and located beside the positioning table 102, a cleaning cloth releasing mechanism 202 fixed behind and above the frame 201 to release the cleaning cloth, a vibrating cloth pressing mechanism 203 fixed below the frame 201 to press the cleaning cloth on the display screen of the smart mobile device 2000 that located on the positioning table 102 below the cleaning cloth, so as to clean the display screen of the smart mobile device by driving the cleaning cloth by vibration, and a cleaning cloth rolling mechanism 204 fixed in front of and above the frame 201 to roll up the used cleaning cloth.

Since the display screen cleaning mechanism 20 includes the cleaning cloth releasing mechanism 202 to release the cleaning cloth, the vibrating cloth pressing mechanism 203 to press the cleaning cloth on the display screen of the smart mobile device 2000 below it, so as to drive the cleaning cloth to clean the screen of the smart mobile device 2000 by uniform vibration of the vibrating cloth pressing mechanism 203, and the cleaning cloth rolling mechanism 204 to roll up the used cleaning cloth, thus, the display screen of the smart mobile device 2000 of users may be automatically cleaned by the vibrating cloth pressing mechanism 203, which frees the trouble of manual cleaning and saves time.

Furthermore, when a piece of the cleaning cloth gets dirty after use, it may be rolled up by the cleaning cloth rolling mechanism 204, and a piece of new and clean cleaning cloth will be released for use by the cleaning cloth releasing mechanism 202, so that the continuous reuse of the dirty cleaning cloth may be avoided, so that the subsequent display screen of smart mobile device of other users may be cleaned with a clean cleaning cloth, so that the cleaning effect is good.

Meanwhile, the vibrating cloth pressing mechanism 203 drives the cleaning cloth to clean the screen of the smart mobile device 2000 by uniform vibration by pressing the cleaning cloth on the screen of the smart mobile device 2000 that located below the cleaning cloth, so that the cleaning intensity is uniform and in good control, so that the crush of the display screen of the mobile device due to too large cleaning intensity and the bad cleaning effect due to too small cleaning intensity will be avoided.

Thereby, the use effect of the present disclosure may be effectively improved.

Specifically, in the present disclosure, the cleaning cloth releasing mechanism 202 includes a first rotary motor 2021 fixed above the frame 201 and connected with the master controller to release the cleaning cloth, a first reel 2022 arranged on the rotating shaft of the first rotary motor 2021 and rolled up with cleaning cloth, and a cloth guide wheel 2023 arranged on the frame 201 and below the first reel 2022.

The vibrating cloth pressing mechanism 203 includes a fixing base 2031 fixed below the frame 201, a vibrating base 2033 mounted at the lower side of the fixing base 2031 by a spring component 2032, a vibrating motor 2034 fixed on the vibrating base 2033 and connected with the master controller, and two parallel superior rubber strips 2035 mounted at the bottom of the vibrating base 2033 to press the cleaning cloth downward.

The cleaning cloth rolling mechanism 204 includes a second rotary motor 2041 fixed above the frame 201 and connected with the master controller to roll up the cleaning cloth, a cloth rolling main roller 2042 arranged on the rotating shaft of the second rotary motor 2041 to guide the cleaning cloth, a cloth rolling auxiliary roller 2043 arranged on the frame 201 and located beside the cloth rolling main roller 2042 to compress the cleaning cloth to the cloth rolling main roller 2042, and a second reel 2045 arranged on the frame 201 and above the cloth rolling main roller 2042 and linked connected with the rotating shaft of the second rotary motor 2041 by drive belt 2044 to roll up the cleaning cloth.

Thus, it is clear that when the present self-service film sticking machine for smart mobile device is used, the cleaning cloth used is released by the cleaning cloth releasing mechanism 202, pressed downward and stretched tight by the vibrating cloth pressing mechanism 203, and rolled up by the cleaning cloth rolling mechanism 204, after passing through the vibrating cloth pressing mechanism 203, the cleaning cloth used is pressed downward to the display screen of the smart mobile device 2000 by the two superior rubber strips 2035 so as to clean the display screen of the smart mobile device 2000, while the two superior rubber strips 2035 have certain flexibility, thus, the display screen of the smart mobile device 2000 is not prone to be damaged.

Moreover, the display screen cleaning mechanism 20 further includes a plurality of idler rollers 205 mounted on the frame 201 to pull the cleaning cloth, which are uniformly distributed beside and above the two superior rubber strips 2035.

Thus, the plurality of idler rollers 205 may play a certain role in pulling the cleaning cloth, so that the cleaning cloth may be tensioned well when it is released and rolled up.

In addition, the display screen cleaning mechanism 20 further includes a cleaning bottle 206 fixed above the frame 201 with cleaning solution filled, a humidifying nozzle 207 fixed below the frame 201 and located between the middle and above of the two superior rubber strips 2035 to automatically spray the cleaning solution to the cleaning cloth below, an inverted L-shaped bracket 208 mounted on the frame 201 and located at the back side of the two superior rubber strips 2035, and an ultraviolet LED light strip 209 mounted horizontally on the top of the inverted L-shaped bracket 208.

The liquid inlet of the humidifying nozzle 207 is connected with the liquid outlet of the cleaning bottle 206 through a pipeline, and the humidifying nozzle 207 and the ultraviolet LED light strip 209 are further connected with the master controller.

Thus, on the one hand, during the process of cleaning the display screen of the smart mobile device 2000 by using the cleaning cloth, the cleaning solution may be released on the cleaning cloth by the humidifying nozzle 207, so that the display screen of the smart mobile device 2000 can be effectively cleaned, on the other hand, the display screen of the smart mobile device 2000, which is cleaned after dust removal, may be dried and sterilized by the ultraviolet LED light strip 209 after lighting up, so that is more reliable in use.

Figure 5:
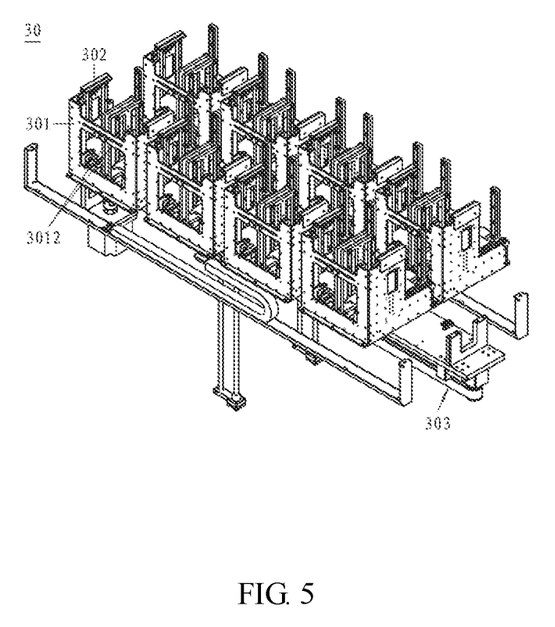
FIG. 5 is a first overall structure diagram of a film sheet feeding mechanism according to the present disclosure.
Figure 6:
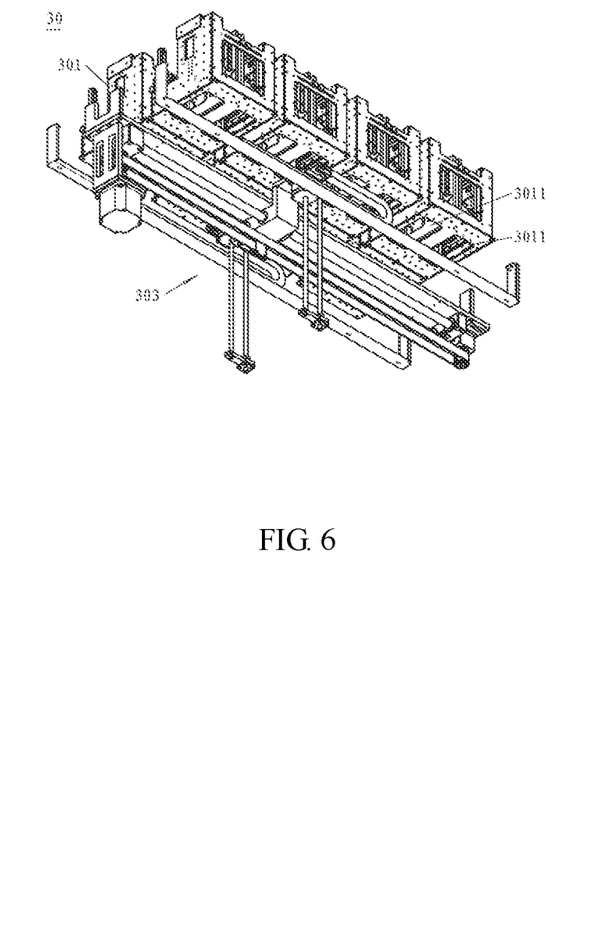
FIG. 6 is a second overall structure diagram of the film sheet feeding mechanism according to the present disclosure.
Figure 7:
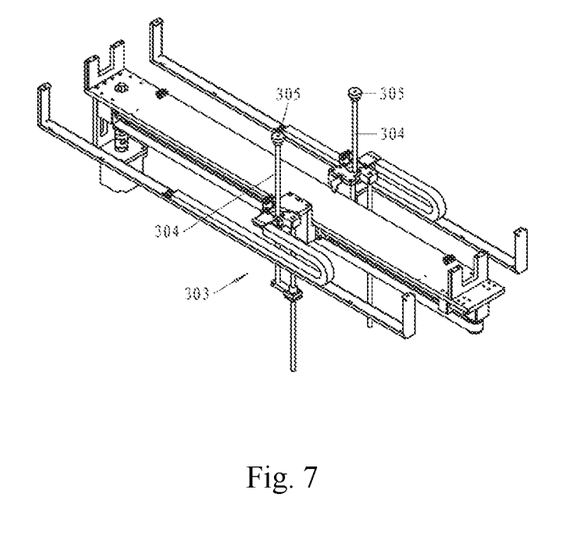
FIG. 7 is an overall structure diagram of the film feeding sheet mechanism without the film sheet holder and the film sheet in-place detection sensor according to the present disclosure.

It should be noted that, in the present disclosure, the film sheet feeding mechanism 30 includes a plurality of film sheet holders, each of which defines an open upper end, the plurality of film sheet holders are arranged side by side from left to right to store film sheets with different types and sizes, a film sheet in-place detection sensor 302 arranged at the inner wall of the open upper end of each film sheet holder 301 and connected with the master controller, a belt drive linear module B303 arranged at the bottom of the plurality of the film sheet holders 301 along the left and right directions, a motor lifting member 304 fixed on the belt drive linear module B303 in the vertical direction and connected with the master controller, and a pushing member 305 arranged on the top of the motor lifting member 304.

The inner bottom of each film sheet holder 301 is defined with a slot 3011 downward. Under the control of the master controller, the belt drive linear module B303 drives the motor lifting member 304 to move side-to-side to allow the pushing member 305 corresponding to the position of any slot 3011, and under the control of the master controller, the motor lifting member 304 drives the pushing member 305 to rise to the corresponding position inside the slot 3011 to allow the film sheets 3000 placed in the film sheet holders in the corresponding position to be pushed upward to the open upper end of the film sheet holder 301.

Thus, on the one hand, when sticking film on the display screen of the smart mobile device 2000 is needed, the film sheets 3000 stacked inside the film sheet holders 301 in the corresponding position are pushed upward, when the master controller controlling the belt drive linear module B303 to drive the motor lifting member 304 to move to the preset position below the corresponding slot 3011, and then the master controller controls the motor lifting member 304 to move upward. The pushing of the film sheet 3000 is stopped when it is detected by the film sheet in-place detection sensor 302, and then the three-dimensional travelling mechanism 60 controls the film sticking manipulator 50 to grasp the film sheet 3000 in the top layer of the stacked film sheets 3000 to the next process. On the other hand, since the plurality of the film sheet holders 301 are provided, the film sheets 3000 with different types and sizes are placed inside different film sheet holders 301 for users to choose according to the types and sizes of their smart mobile device 2000, which makes the present disclosure have more comprehensive functions, stronger practicability, and stronger reliability in use.

Preferably, in the present disclosure, the film sheet holder 301 is provided with two rows, and the motor lifting member 304 and the pushing member 305 are provided with two sets respectively. The left and right sides inside each film sheet holder 301 are defined with the slot 3011 respectively, and the middle part inside each film sheet holder 301 is defined with two left-right movable plates 3012 along the front and rear directions, so that each film sheet holder 301 is divided into two film sheet storage bins to place the film sheet 3000 respectively.

The size of the two film sheet storage bins are adjustable when moving the two movable plates 3012 left or right.

Thereby, on the one hand, the two motor lifting member 304 are driven to move synchronically to the preset position by the belt drive linear module B303, the film sheets 3000 inside the film sheet holders 301 that needed are pushed up, when the master controller controls one of the motor lifting member 304 to move upward, so as to make effective use of the resources and greatly reduce the equipment cost. On the other hand, the size of the two film sheet storage bins are adjustable when moving the two movable plates 3012 left or right, so as to correspondingly place the film sheet 3000 with different sizes inside the two corresponding storage bins.

Figure 8:
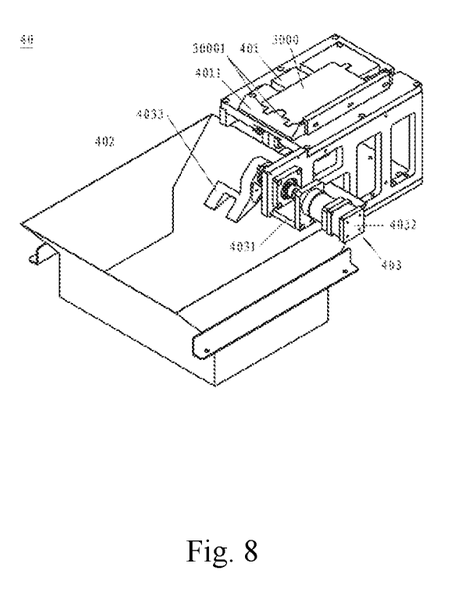
FIG. 8 is an overall structure diagram of a film stripping mechanism according to an exemplary embodiment of the present disclosure.

In addition, as the embodiment shown, the film stripping mechanism 40 includes a film sheet turntable 401 arranged at the left rear side of the upper end surface of the case, a waste collection box 402 having an open upper end arranged at the left front side of the upper end surface of the case, and a film-tearing device 403 arranged beside the waste collection box 402 to tear the bottom protective film.

A slope 4011 set forward and downward is defined in the front end of the film sheet turntable 401, the front edge of the slope 4011 is connected to the back edge of the open upper end of the waste collection box 402. The film-tearing device 403 includes a film-tearing base 4031 arranged at the upper end surface of the case, a rotary motor 4032 fixed towards left on the film-tearing base 4031 and connected with the master controller, and a press claw 4033 fixed on the left rotating shaft of the rotary motor 4032 to compress the tear-prone part 30001 in the front side of the bottom protective film to the slope 4011.

Thus, the bottom protective film and the surface base film are automatically separated, when the rotary motor 4032 drives the press claw 4033 to compress the tear-prone part 30001 in the front side of the bottom protective film to the slope 4011, and the film sticking manipulator 50 picks up the surface base film.

Furthermore, on this basis, the three-dimensional travelling mechanism 60 of the present disclosure includes a left bracket 601, a right bracket 602, a drive motor 603 fixed at the front end of the left bracket 601, a first driven wheel 604 fixed at the back end of the left bracket 601, a left gearing wheel belt 605 sleeved between the rotating shaft of the drive motor 603 and the first driven wheel 604, a second driven wheel 606 fixed at the back end of the right bracket 602, a third driven wheel 607 fixed at the front end of the right bracket 602, a right gearing wheel belt 608 sleeved between the second driven wheel 606 and the third driven wheel 607, a transmission shaft 609 connected between the first driven wheel 604 and the second driven wheel 606, a front-back slide rail 610 arranged at the upper end surface of the left bracket 601 and the right bracket 602 along the front and rear directions, a crossbeam component 611 where the left and right sides are correspondingly fixed at the left gearing wheel belt 605 and the right gearing wheel belt 608 and the two sides of the bottom are front-back movably clamped outside the front-back slide rail 610, a screw drive linear module 612 fixed at the upper end surface of the crossbeam component 611 along the left and right directions, a belt drive linear module C613 arranged at the front side of the upper slider of the screw drive linear module 612 along the up and down directions, and a belt drive linear module D614 arranged at the back side of an upper slider of the screw drive linear module 612 along the up and down directions.

The drive motor 603, the screw drive linear module 612, the belt drive linear module C613, and the belt drive linear module D614 are connected with the master controller respectively.

Figure 9:
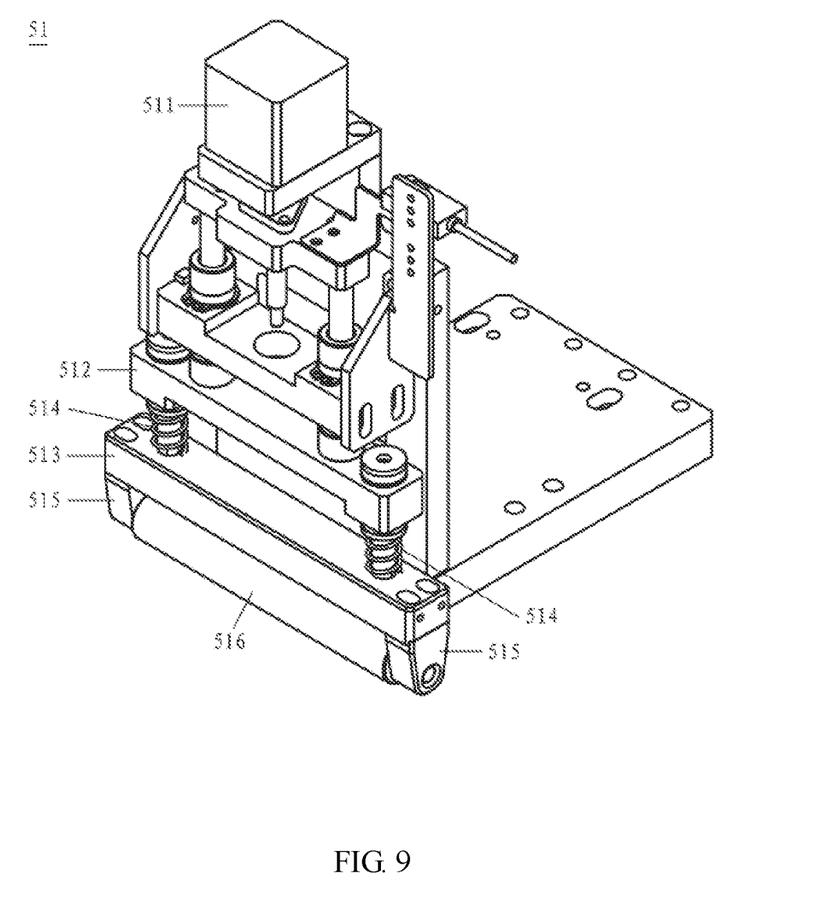
FIG. 9 is an overall structure diagram of a film pressing member according to an exemplary embodiment of the present disclosure.

Furthermore, the film sticking manipulator 50 includes a film pressing member 51 fixed at a front slider of the belt drive linear module C613 and a vacuum suction plate 52 fixed at a back slider of the belt drive linear module D614 and connected with the master controller.

The film pressing member 51 includes a screw lifting motor 511 fixed at the upper slider of the belt drive linear module C613 along the vertical direction and connected with the master controller, a connecting plate A512 horizontally fixed at the bottom of the screw lifting motor 511, a connecting plate B513 horizontally arranged below the connecting plate A512, an elastic buffer 514 fixed between the connecting plate A512 and the connecting plate B513, two lugs 515 respectively arranged at the left and the right sides of the bottom of the connecting plate B513, and a roll barrel 516 rotatably connected between the two lugs 515.

Thus, on the one hand, the front-back motion of the film sticking manipulator 50 is realized by the master controller controlling the drive motor 603 to drive the left gearing wheel belt 605 and the right gearing wheel belt 608 to rotate, the left-right motion of the film sticking manipulator 50 is realized by the master controller controlling the sliding of the screw drive linear module 612 to move left and right, the up-down motion of the film pressing member 51 of the film sticking manipulator 50 is realized by the master controller controlling the sliding of the belt drive linear module C613 to move up and down, the up-down motion of the vacuum suction plate 52 of the film sticking manipulator 50 is realized by the master controller controlling the sliding of the belt drive linear module D614 to move up and down.

On the other hand, after being sucked and stuck on the display screen of the smart mobile device 2000 by the vacuum suction plate 52, the surface base film is rolled when the screw lifting motor 511 controlling the roll barrel 516 to move down to a certain position. In the process of this step, the belt drive linear module A101 synchronically drives the positioning table 102 to move front and back.

Further, the smart mobile device 2000 is smart phones or tablet computers.

Furthermore, in the present disclosure, the belt drive linear module A101, the belt drive linear module B303, the belt drive linear module C613, and the screw drive linear module 612 are common as those in the existing gantry type film sticking machine, and are the common and mature technologies, thus do not be described in detail here.

Further, in the present disclosure, the lifting components such as the motor lifting member 304 and the screw lifting motor 511 may be replaced by the conventional lift cylinders, the film sticking manipulator 50 designed in the present disclosure may be replaced by the multiple axis manipulator such as the conventional three-axis manipulator in the prior art, thus the specific structural thereof does not be described in detail here.

Other embodiments will not be illustrated one by one here either.

In conclusion, regarding the present disclosure, the overall structure is simple, it is easy to implement and operate, it has strong practicability, strong specificity and low manufacturing cost, which makes it inevitably have good market promotion value. The present disclosure will be very popular and effectively popularized.

The embodiments above are preferably embodiments of the present disclosure, and the present disclosure is not limited to such embodiments, equivalent structure conversion based on the specification and the drawing of the present disclosure, or directly or indirectly used in other related technical field, both similarly within the protection scope of the present disclosure.

What is claimed is:

1. A self-service film sticking machine for smart mobile device, comprising a case and a master controller arranged in the case, wherein the self-service film sticking machine for smart mobile device further comprises:
   a fixing table, the fixing table being slidably defined on the middle of an upper end surface of the case, and connected with the master controller, for fixing a smart mobile device where the display screen needs film-sticking;
   a display screen cleaning mechanism, the display screen cleaning mechanism being arranged upon the upper end surface of the case, and located above and in front of the fixing table, and connected with the master controller, for cleaning the display screen of the smart mobile device that is fixed on the fixing table;

a film sheet feeding mechanism, the film sheet feeding mechanism being fixed at a rear side of the upper end surface of the case, and connected with the master controller, for feeding a film sheet having bottom protective film and surface base film, and a tear-prone part being defined forward in a front side of the bottom protective film;

a film stripping mechanism, the film stripping mechanism being fixed at the left side of the upper end surface of the case, and connected with the master controller, for stripping the bottom protective film of the film sheet fed by the film sheet feeding mechanism;

a film sticking manipulator, the film sticking manipulator being fixed on a three-dimensional travelling mechanism; and the three-dimensional travelling mechanism, the three-dimensional travelling mechanism being arranged upon the upper end surface of the case, and connected with the master controller, for controlling front-back, left-right, and up-down motions of the film sticking manipulator, so that the film sticking manipulator grasps the film sheet fed by the film sheet feeding mechanism to the film stripping mechanism for stripping the bottom protective film, and grasps and attaches the stripped surface base film to the display screen of the smart mobile device which is fixed on the fixing table and has been cleaned by the display screen cleaning mechanism.

2. The self-service film sticking machine for smart mobile device according to claim 1, wherein the fixing table comprises a belt drive linear module A set along front and rear directions and connected with the master controller, and a positioning table fixed at an upper end surface of the belt drive linear module A;

a middle of the upper end surface of the positioning table defines a receiving cavity for receiving the smart mobile device; a depth of the receiving cavity is less than a thickness of the smart mobile device, an inner wall of the receiving cavity is evenly defined with a plurality of elastic clamps connected with the master controller for clamping the smart mobile device received in the receiving cavity.

3. The self-service film sticking machine for smart mobile device according to claim 2, wherein the display screen cleaning mechanism comprises a frame located in a middle and front of the upper end surface of the case and beside the positioning table, a cleaning cloth releasing mechanism fixed behind and above the frame and configured for releasing cleaning cloth, a vibrating cloth pressing mechanism fixed below the frame and configured for pressing the cleaning cloth on the display screen of the smart mobile device that located on the positioning table below the cleaning cloth, for cleaning the display screen of the smart mobile device by driving the cleaning cloth by vibration, and a cleaning cloth rolling mechanism fixed in front of and above the frame for rolling up a used cleaning cloth;

the cleaning cloth releasing mechanism comprises a first rotary motor fixed above the frame and connected with the master controller for releasing the cleaning cloth, a first reel arranged on a rotating shaft of the first rotary motor and rolled up with cleaning cloth, and a cloth guide wheel arranged on the frame and below the first reel;

the vibrating cloth pressing mechanism comprises a fixing base fixed below the frame, a vibrating base mounted at a lower side of the fixing base by a spring component, a vibrating motor fixed on the vibrating base and connected with the master controller, and two parallel superior rubber strips mounted at a bottom of the vibrating base for pressing the cleaning cloth downward;

the cleaning cloth rolling mechanism comprises a second rotary motor fixed above the frame and connected with the master controller for rolling up the cleaning cloth, a cloth rolling main roller arranged on a rotating shaft of the second rotary motor for guiding the cleaning cloth, a cloth rolling auxiliary roller arranged on the frame and located beside the cloth rolling main roller for compressing the cleaning cloth to the cloth rolling main roller, and a second reel arranged on the frame and above the cloth rolling main roller and linked connected with the rotating shaft of the second rotary motor by drive belt for rolling up the cleaning cloth.

4. The self-service film sticking machine for smart mobile device according to claim 3, wherein the display screen cleaning mechanism further comprises a cleaning bottle fixed above the frame with cleaning solution filled, a humidifying nozzle fixed below the frame and located between a middle and above of the two superior rubber strips for automatically spraying the cleaning solution to the cleaning cloth below, an inverted L-shaped bracket mounted on the frame and located at a back side of the two superior rubber strips, and an ultraviolet LED light strip mounted horizontally on a top of the inverted L-shaped bracket;

a liquid inlet of the humidifying nozzle is connected with a liquid outlet of the cleaning bottle through a pipeline, and the humidifying nozzle and the ultraviolet LED light strip are further connected with the master controller.

5. The self-service film sticking machine for smart mobile device according to claim 1, wherein the film sheet feeding mechanism comprises a plurality of film sheet holders, each of which defines an open upper end, the plurality of film sheet holders are arranged side by side from left to right for storing film sheets with different types and sizes, a film sheet in-place detection sensor arranged at the inner wall of the open upper end of each film sheet holder and connected with the master controller, a belt drive linear module B arranged at a bottom of the plurality of film sheet holders along left and right directions, a motor lifting member fixed on the belt drive linear module B in a vertical direction and connected with the master controller, and a pushing member arranged on a top of the motor lifting member;

an inner bottom of each film sheet holder is defined with a slot downward; under the control of the master controller, the belt drive linear module drives the motor lifting member to move side-to-side to allow the pushing member corresponding to a position of any slot, and under the control of the master controller, the motor lifting member drives the pushing member to rise to the corresponding position inside the slot to allow the film sheets placed in the film sheet holders in the corresponding position be pushed upward to the open upper end of the film sheet holders.

6. The self-service film sticking machine for smart mobile device according to claim 5, wherein the film sheet holder is provided with two rows, and the motor lifting member and the pushing member are provided with two sets respectively; and left and right sides inside each film sheet holder are defined with the slot respectively, and a middle part inside each film sheet holder is defined with two left-right movable plates along front and rear directions, so that each film sheet holder is divided into two film sheet storage bins;

sizes of the two film sheet storage bins are adjustable when moving the two movable plates left or right.

7. The self-service film sticking machine for smart mobile device according to claim 1, wherein the film stripping mechanism comprises a film sheet turntable arranged at a left rear side of the upper end surface of the case, a waste collection box having an open upper end arranged at a left front side of the upper end surface of the case, and a film-tearing device arranged beside the waste collection box for tearing the bottom protective film;

a slope set forward and downward is defined in a front end of the film sheet turntable, a front edge of the slope is connected to a back edge of the open upper end of the waste collection box; the film-tearing device includes a film-tearing base arranged at the upper end surface of the case, a rotary motor fixed towards left on the film-tearing base and connected with the master controller, and a press claw fixed on a left rotating shaft of the rotary motor for compressing a tear-prone part in the front side of the bottom protective film to the slope;

the bottom protective film and the surface base film are automatically separated, when the rotary motor drives the press claw to compress the tear-prone part in the front side of the bottom protective film to the slope, and the film sticking manipulator picks up the surface base film.

8. The self-service film sticking machine for smart mobile device according to claim 1, wherein the three-dimensional travelling mechanism comprises a left bracket, a right bracket, a drive motor fixed at a front end of the left bracket, a first driven wheel fixed at a back end of the left bracket, a left gearing wheel belt sleeved between a rotating shaft of the drive motor and the first driven wheel, a second driven wheel fixed at a back end of the right bracket, a third driven wheel fixed at a front end of the right bracket, a right gearing wheel belt sleeved between the second driven wheel and the third driven wheel, a transmission shaft connected between the first driven wheel and the second driven wheel, a front-back slide rail arranged at upper end surfaces of the left bracket and the right bracket along front and rear directions, a crossbeam component where left and right sides are correspondingly fixed at the left gearing wheel belt and the right gearing wheel belt and two sides of the bottom are front-back movably clamped outside the front-back slide rail, a screw drive linear module fixed at an upper end surface of the crossbeam component along left and right directions, a belt drive linear module C arranged at a front side of an upper slider of the screw drive linear module along up and down directions, and a belt drive linear module D arranged at a back side of the upper slider of the screw drive linear module along the up and down directions;

the drive motor, the screw drive linear module, the belt drive linear module C, and the belt drive linear module D are connected with the master controller respectively.

9. The self-service film sticking machine for smart mobile device according to claim 8, wherein the film sticking manipulator comprises a film pressing member fixed at a front slider of the belt drive linear module C, and a vacuum suction plate fixed at a back slider of the belt drive linear module D and connected with the master controller;

the film pressing member comprises a screw lifting motor fixed at an upper slider of the belt drive linear module C along a vertical direction and connected with the master controller, a connecting plate A horizontally fixed at a bottom of the screw lifting motor, a connecting plate B horizontally arranged below the connecting plate A, an elastic buffer fixed between the connecting plate A and the connecting plate B, two lugs respectively arranged at left and the right sides of the bottom of the connecting plate B, and a roll barrel rotatably connected between the two lugs.

10. The self-service film sticking machine for smart mobile device according to claim 1, wherein the smart mobile device is a smart phone or a tablet computer.

\* \* \* \* \*